June 21, 1960 O. E. DE LANGE 2,942,196

VARIABLE BANDWIDTH TIMING CIRCUIT FOR SELF-TIMED REGENERATIVE PULSE REPEATERS

Filed July 11, 1958

INVENTOR
O. E. DE LANGE
BY R. B. Ardis
ATTORNEY

United States Patent Office 2,942,196
Patented June 21, 1960

2,942,196

VARIABLE BANDWIDTH TIMING CIRCUIT FOR SELF-TIMED REGENERATIVE PULSE REPEATERS

Owen E. De Lange, Rumson, N.J., assignor to Bell Telephone Laboratories, Incorporated, New York, N.Y., a corporation of New York Filed July 11, 1958, Ser. No. 748,009
12 Claims. (Cl. 328—164)

This invention relates to pulse transmission systems and more particularly to timing circuits used in microwave regenerative pulse repeaters.

In order to avoid complications that might arise in generating an independent local timing wave or receiving a timing wave over a transmission channel separate and apart from the main signal pulse channel, regenerative pulse repeaters are often self-timed. In such repeaters, the timing frequency component, which is always present in a signal pulse train having a basic pulse repetition rate, is recovered by filtering and used as a timing wave to control the regeneration process. The recovery filter of a self-timed repeater usually has a high-Q (i.e., ratio of reactance to resistance) and a correspondingly narrow bandwidth, primarily to eliminate as many extraneous components as possible from the timing wave. Phase and amplitude deviations of the timing wave are thereby reduced.

It is well known, however, that the transient response of a high-Q circuit is slower than that of a circuit having a low-Q. This slow response, particularly as measured by the so-called rise time, may be of material consequence in a pulse transmission system comprising a long chain of self-timed regenerative pulse repeaters, each of which includes a high-Q timing filter. Although it is desired that the Q of a filter used in a timing circuit be high, in fulfillment of this desire, the rise time of the circuit may cause an excessive delay in the build up of the timing wave. When one considers that this delay may occur in each repeater of the system, it will be seen that the resultant cumulative delay or "start-up" time of such a system may be sufficient to cause substantial errors in a signal which is finally received. This cumulative delay will be understood if it is remembered that each regenerator in the system is, in effect, an "AND" gate, the output of which is dependent on the substantially simultaneous application of a received information-carrying signal and the timing wave. If, as a result of excessive start-up time, the timing wave is unduly delayed in the timing circuit, some of the information-carrying signal supplied to the input of the regenerator will not appear at the output thereof. The resultant cumulative error throughout the system may thus reach intolerable proportions.

Accordingly, it is an object of this invention to avoid transmission errors originating in the timing circuitry of self-timed regenerative pulse repeaters.

It is a more particular object of the invention to reduce the "start-up" time in such timing circuitry.

It is yet a more particular object of the invention to achieve the advantages of a high-Q filter in the timing circuitry of a self-timed microwave regenerative pulse repeater and still avoid delay in the recovered timing wave.

In accordance with the invention, both a low-Q timing filter and a high-Q timing filter are provided in the timing circuit of each repeater of a pulse transmission system along with switching means for selectively including either of the filters in the timing circuit. Each repeater of the system is started using the low-Q filter in its timing circuit and, after an appropriate interval determined by the rise time of the high-Q filter, is switched over to high-Q operation. The start-up time of the system is thereby substantially reduced.

The invention will be understood more fully from the following more detailed description read in conjunction with the accompanying drawing in which.

Figure 1:
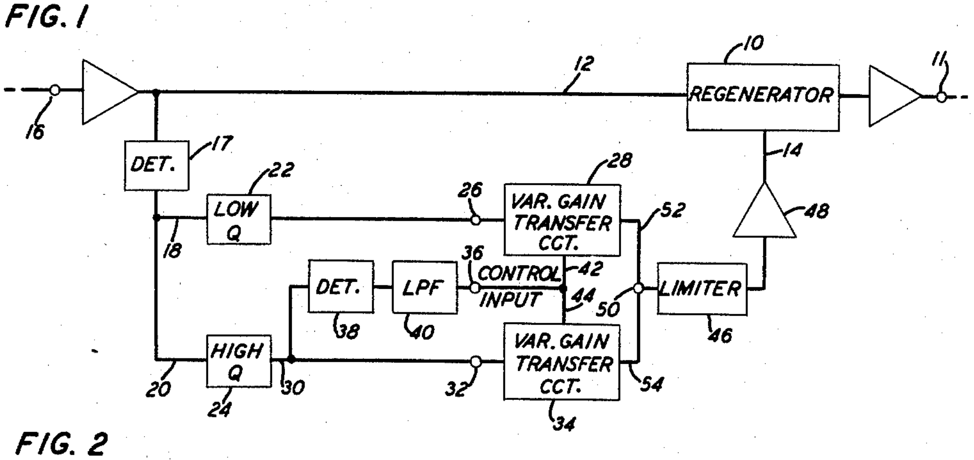
Fig. 1 is a block diagram which shows the timing circuit of a self-timed regenerative pulse repeater arranged in accordance with the invention.

In Fig. 1 the timing circuit of a self-timed microwave regenerative pulse repeater is shown diagrammatically in accordance with the invention. A "self-timed" regenerative pulse repeater is, as mentioned above, one in which the timing wave is derived from the signal pulse train as it is supplied to the repeater. The timing wave has a frequency equal to the basic pulse repetition rate of the signal pulse train. The regenerator 10 supplies a signal to the output 11 of the repeater whenever there is a concurrence of received information-carrying pulses supplied to its input 12 and timing pulses supplied to its input 14. The information-carrying signal is received at the repeater input 16, is amplified, and passed on to the regenerator input 12. The envelope of this received signal, which may consist of a pulse-modulated radio frequency signal, is detected by detector 17 and supplied to the inputs 18 and 20 of the low-Q filter 22 and the high-Q filter 24, respectively. These filters are tuned to a frequency equal to the basic pulse repetition rate of the received signal. The high-Q filter may advantageously be of a heterodyne type disclosed in a copending application, Serial No. 745,392, of J. C. Schelleng which was filed August 11, 1958.

The output of the low-Q filter 22 is connected to the timing signal input 26 of a so-called variable-gain transfer circuit 28. The output 30 of the high-Q filter 24 is connected to the timing signal input 32 of another variable-gain transfer circuit 34. The transfer circuits 28 and 34, which will be discussed in more detail later, are differentially operated (i.e., as the gain of one is increased that of the other is decreased) and serve to transfer the timing wave from their respective filters to the regenerator 10—hence the term "variable-gain transfer circuit."

A circuit for controlling the gain of the respective transfer circuits interconnects a control input 36 and the output of the high-Q filter 24. This gain control circuit consists of a detector 38 and a low-pass filter 40, which may be a simple R-C integrator circuit. A direct-current potential corresponding to the amplitude of the timing wave supplied to the output 30 of the high-Q filter 24 is thereby supplied to the control input 36. This direct potential is in turn supplied to the control inputs 42 and 44 of the transfer circuits 28 and 34, respectively.

The transfer circuits are arranged so that an increase in the control potential supplied via detector 38 and low-pass filter 40 to the control input 36 will cause an increase in the gain of one transfer circuit and a concomitant decrease in the gain of the other. In the embodiment shown, such an increase in the control potential, supplied to the control input 36, causes an increase in the gain of the transfer circuit 34 and a corresponding decrease in the gain of transfer circuit 28, which, prior to the presence of the timing wave at the output 30 of the high-Q filter 24, was biased to transfer the timing wave with full gain to the regenerator 10 by way of the low-Q circuit 22.

It can be seen, therefore, that when information-carrying signal pulses are first supplied to the input 16 of the repeater, detected by detector 17, and supplied to the inputs 18 and 20 of the filters 22 and 24, respectively, the timing wave is supplied to the input 14 of regenerator 10 exclusively by way of the low-Q filter 22. After a predetermined time interval, somewhat greater than the rise time of the high-Q filter 24, the timing circuit is switched over exclusively to high-Q operation by the control circuit which interconnects the output 30 of the high-Q filter 24 and the control inputs 42 and 44 of the transfer circuits 28 and 34, respectively. The delay inherently caused by the relatively long rise time (i.e., slow transient response) of the high-Q filter 24 is thereby avoided.

The above-mentioned predetermined time interval is determined by a combination of the rise time of the high-Q filter 24 and the time constant of the low-pass filter 40. The total time interval may thus be adjusted by adjusting the time constant of the low-pass filter 40.

A circuit consisting of a limiter 46 and an amplifier 48 interconnects the timing input 14 of regenerator 10 and the common junction 50 of the outputs 52 and 54 of the variable-gain transfer circuits 28 and 34, respectively.

Figure 2:
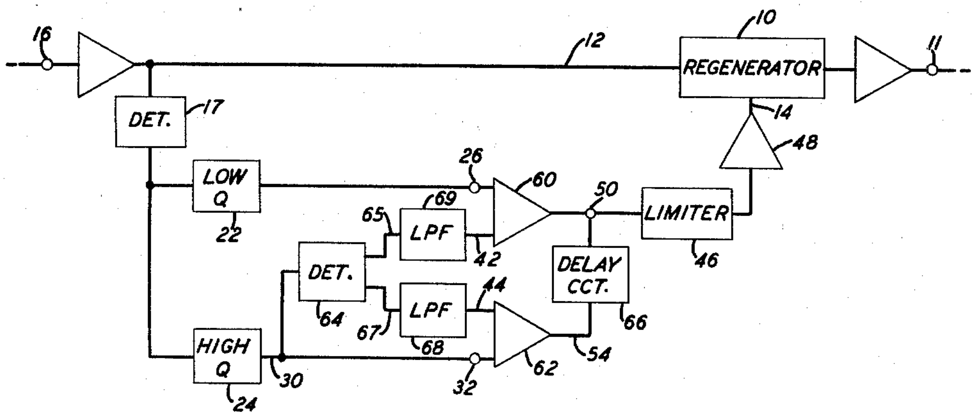
Fig. 2 is a block diagram similar to that of Fig. 1 wherein the variable-gain transfer circuits of Fig. 1 are shown as variable-gain amplifiers.

Fig. 2 shows another arrangement of a timing circuit for a self-timed microwave regenerative pulse repeater arranged in accordance with the invention. This timing circuit is identical to that of Fig. 1 except that the variable-gain amplifiers 60 and 62 have been substituted for the transfer circuits 28 and 34, respectively, of Fig. 1; and a modification has been made in the control circuit interconnecting the output 30 of high-Q filter 24 and the control inputs 42 and 44 of amplifiers 60 and 62, respectively.

The detector 64 has two outputs, 65 and 67, the potentials of which are equal in magnitude but of opposite polarity. Low-pass filters couple these potentials to the control inputs 42 and 44 of amplifiers 60 and 62, respectively. As in the arrangement of Fig. 1, the amplifier 60 is biased to be operative to transmit energy from the low-Q filter 22 only during a time approximately equal to the rise time interval of the high-Q filter 24. Meanwhile (i.e., during the rise time of the high-Q filter 24), amplifier 62 gradually changes from an inoperative state to fully conductive operation. When, therefore, the rise time of the high-Q filter 24 has lapsed, the timing wave detected by detector 17 is fully manifest at the output 30 of the high-Q filter 24; and at a slightly later time, determined by the time constants of the low-pass filters 68 and 69, the amplifier 60 is biased to cut-off by the resultant control potential supplied via detector 64 to the control input 42 of amplifier 60, and amplifier 62 is biased to be fully conductive. The timing circuit will, it should be noted, continue its high-Q operation until an interruption in the transmission of the information carrying signal pulses occurs—at which time the timing circuit reverts to its low-Q state.

The delay circuit 66, which may be an ordinary delay line, interconnects the output 54 of amplifier 62 and the common junction 50. The delay is provided so that the phase of the timing wave, as it is supplied by way of of the high-Q filter 24, is rendered substantially identical to the phase of the wave as it was supplied via the low-Q filter 22. In this way, the phase of the timing wave is not altered when the timing circuit is switched from low-Q to high-Q operation. The delay of circuit 66 is preferably adjustable and normally need be adjusted only at the time of installation.

Figure 3:
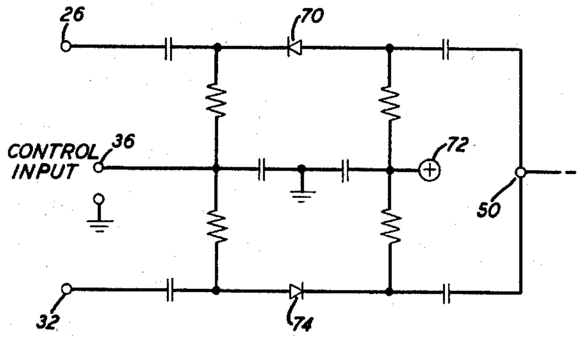
Fig. 3 is a detailed circuit diagram of a diode attenuator circuit which may be used for the variable-gain transfer circuits of Fig. 1.

Fig. 3 shows in detail a diode attenuator circuit which combines the functions of the variable-gain transfer circuits 28 and 34 of Fig. 1. As in Fig. 1, the control input 36 is supplied with a direct potential corresponding to the amplitude of the timing wave as it appears at the output 30 of the high-Q filter 24. It will be noted, therefore, that there is substantially no potential at the control input 36 when the envelope of the received pulse-modulated signal is first detected by detector 17, since, as previously mentioned, the high-Q filter 24 has a relatively long rise time. Accordingly, at this time the diode 70 is forward-biased by the positive potential supplied by the direct-current source 72, and the timing circuit is enabled to supply a timing wave to the regenerator 10 only by way of the low-Q filter 22 and diode 70. It will also be noted that diode 74 is reverse-biased by the direct potential source 72 when the timing circuit is low-Q operated. As the amplitude of the timing wave supplied to the output 30 of the high-Q filter 24 increases, the amplitude of the direct potential supplied to the control input 36 increases and eventually overcomes the potential supplied by the direct-current source 72. When the potential of the control input 36 exceeds that of source 72, diode 70 becomes reverse-biased, diode 74 becomes forward-biased, and the timing circuit is switched from low-Q operation to high-Q operation. It will be noted, moreover, that the diode attenuator circuit of Fig. 3 provides for a smooth and gradual transition of the timing circuit from low-Q to high-Q operation.

Although the present invention has been described with reference to specific embodiments, they should be considered as illustrative for the invention also comprehends such other embodiments as may come within its spirit and scope.

What is claimed is:

1. A frequency-selective system for selecting a predetermined frequency component from a signal wave comprising, an input and an output, means to supply a signal wave to said input, means to detect said predetermined component, dual filtration paths intercoupling said detector means and said system output, each of said filtration paths including a filter circuit and a variable-gain transfer circuit, the filter circuit of one of said filtration paths having a Q substantially greater than that of the filter circuit of the other path, and means responsive to the signal level at the output of said higher-Q filter circuit for routing said detected component through said one path or the other.

2. A timing circuit for a regenerative pulse repeater comprising a relatively high-Q filter and a relatively low-Q filter, switching means for exclusively including said high-Q filter in said timing circuit only after a predetermined time interval from the activation of said regenerative repeater dependent upon the rise time of said high-Q filter, and means responsive to the output signal level of said high-Q filter for controlling the operation of said switching means.

3. A timing circuit in accordance with claim 2 wherein said low-Q filter is included in the timing circuit by said switching means during said predetermined time interval.

4. A timing circuit for a regenerative pulse repeater comprising a relatively high-Q filter and a relatively low-Q filter and switching means for exclusively including said high-Q filter in said timing circuit after a predetermined time interval from the activation of said regenerative repeater, said switching means comprising a pair of differentially-operated variable-gain transfer circuits, each having a timing wave input and a control input and each being associated with a different one of said filters.

5. A timing circuit in accordance with claim 4 wherein means, including a detector circuit, for differentially operating said variable-gain transfer circuits intercouple the timing wave and control inputs of the transfer circuit associated with said high-Q filter and also intercouple said last-named timing wave input and the control input of the transfer circuit associated with said low-Q filter.

6. A timing circuit in accordance with claim 4 wherein a detector circuit is coupled to the timing wave input of the transfer circuit associated with said high-Q filter, and wherein integrator means couple the output of said detector to the control input of each of said transfer circuits.

7. A timing circuit for a regenerative pulse repeater, which includes a regenerator and means for supplying received signal pulses to the regenerator, comprising: a detector circuit for detecting said received signal pulses; a pair of variable-gain transfer circuits each having a timing wave input, a control input, and an output; a relatively low-Q circuit coupling detected signals from said detector circuit to the timing wave input of one of said pair of transfer circuits; a relatively high-Q circuit coupling said detected signals to the timing wave input of the other of said pair of transfer circuits; control means intercoupling said last-named timing wave input and the respective control inputs of said transfer circuits for differentially controlling the gain of said transfer circuits; and means including amplitude limiter means intercoupling the outputs of said transfer circuits and said regenerator.

8. A timing circuit in accordance with claim 7 wherein said pair of differentially-controlled variable-gain transfer circuits comprises a pair of variable-gain amplifiers; and wherein a delay circuit, for adjusting the phase of the timing wave at the output of the amplifier coupled to said high-Q filter, intercouples the outputs of said variable-gain amplifiers.

9. A timing circuit in accordance with claim 7 wherein said pair of differentially-controlled variable-gain transfer circuits comprises a pair of diode attenuator circuits, and wherein said means intercoupling the outputs of said transfer circuits and said regenerator further includes amplifier means.

10. A timing circuit in accordance with claim 7 wherein said control means for differentially controlling the gain of said transfer circuits comprises conversion means for converting said timing wave, supplied by said high-Q circuit, to a direct potential.

11. A timing circuit in accordance with claim 10 wherein said conversion means includes a detector circuit and a low-pass filter.

12. In combination, a regenerative pulse repeater having a message input and a timing input, a message-wave source, means to supply said message wave to said message input, said message wave including a timing wave as a component thereof, and timing means intercoupling said message-wave source and said repeater timing input, said timing means comprising detector means for detecting said timing wave component, a pair of alternate transmission paths, each including a filter circuit and gating means, for conveying said detected timing wave component to said repeater timing input, one of said filter circuits has a Q substantially greater than that of the other, and control means, responsive to the signal level at the output of said higher-Q filter and controlling the enablement and disablement of said gating means, for enabling transmission through one of said alternate paths to the substantial exclusion of the other.

References Cited in the file of this patent

UNITED STATES PATENTS

| | | |
|---|---|---|
| 2,140,391 | Mayer | Dec. 13, 1938 |
| 2,673,899 | Montgomery | Mar. 30, 1954 |